(No Model.)

F. MURPHY.
NUT LOCK.

No. 261,947. Patented Aug. 1, 1882.

WITNESSES
T. C. Brecht.
John Tyler

INVENTOR
Francis Murphy.
By Wm. C. McIntire
Attorney

UNITED STATES PATENT OFFICE.

FRANCIS MURPHY, OF CHICAGO, ILLINOIS.

NUT-LOCK.

SPECIFICATION forming part of Letters Patent No. 261,947, dated August 1, 1882.

Application filed February 28, 1882. (No model.)

*To all whom it may concern:*

Be it known that I, FRANCIS MURPHY, a citizen of the United States, residing at Chicago, in the county of Cook and State of Illinois, have invented new and useful Improvements in Nut-Locks, of which the following is a specification.

My invention relates to certain improvements in nut-locks.

In the course of the ordinary traffic of a railroad the constant vibrations of passing trains and the chafing of the adjacent irons at the joints loosen the nuts and produce a tendency in them to run off, as is well understood by those familiar with the subject. Many attempts have been made to overcome this dangerous difficulty; but the means employed are as various in their construction and cost as the results obtained.

My invention has for its object to provide a nut-lock simple and economic of construction, readily applied, and effective for the purpose; and with these ends in view my invention consists of a washer made of spring-steel or other suitable metal, slightly curved in longitudinal or cross section, and provided with twisted wings each side of or surrounding the central bolt-passage, the curvature of the washer and its wings being such as hereinafter described to obtain the effects produced by elliptical and torsional springs.

In order that my invention may be fully understood, I will proceed to describe the construction and operation of the same, referring by letters to the accompanying drawings, in which—

Figure 1:
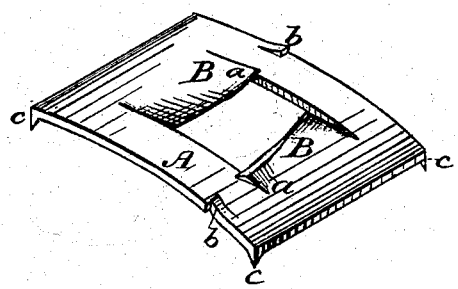
Figure 2:
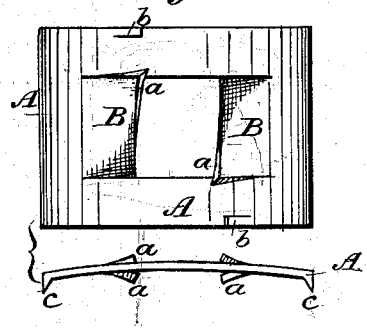
Figure 3:
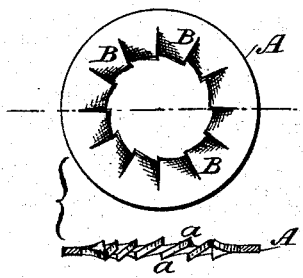
Figure 4:
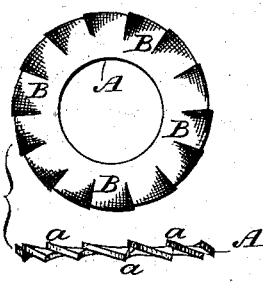

Figure 1 is a perspective view of a nut-lock embracing the features of my invention; Fig. 2, a plan and edge view of the form shown at Fig. 1; Fig. 3, a plan and cross-section of a modification of my invention; Fig. 4, a similar view of another modification, and Fig. 5 a section of a bolt, fish-plate, nut, and washer.

Similar letters of reference denote like parts in the several figures.

A, Fig. 1, represents a washer composed of a piece of spring-steel with the central portion sufficiently removed to permit of the ready passage through the same of a screw-threaded bolt. The metal is cut longitudinally each side of the central orifice to form tongues or wings B B, which are twisted in reverse directions, as clearly indicated, to present projecting knife-edges *a a*, two projecting beyond each side of the washer and two on each side of a central line longitudinal of the washer, there being four projecting corners or edges, *a*. The plate is also slightly curved, as most clearly indicated in the edge view at Fig. 2, so that when the washer is compressed between the nut and fish-plate I get the combined action of the elliptical spring of the plate A and the torsional springs produced by the twisted wings B, which forces tend to impress the sharp or angular edges *a a* into the faces of the nut and fish-plate in an obvious manner and serve to hold the nut against accidental displacement.

One important peculiarity of my invention, to which I call special attention, is the special form of the wings or leaves. In manufacturing the nut-lock the plate, when subjected to the action of dies, is punched out centrally for the passage of a bolt. It is then cut or slit to produce the wings or leaves B. The leaves are then twisted, as hereinbefore described, and finally expanded from their roots toward their free ends laterally beyond their original proportions, so that they cannot, under the compression to which they may be subjected in actual use, be forced back into the space from which they were cut. This general idea is more particularly illustrated in the edge views at Figs. 3 and 4. This construction, it will be seen, presents in the modifications shown at above figures a series of file-teeth, *a a a*, &c., overlying each other, and the spring action of which causes them to seek a seat in the faces of the nut and fish-plate, and the jarring and vibrations which serve usually to loosen the nut in ordinary structures will, when my device is used, tend to more firmly embed the teeth or knife-edges of the wings in the softer metal of the nut and fish-plates.

Figure 5:
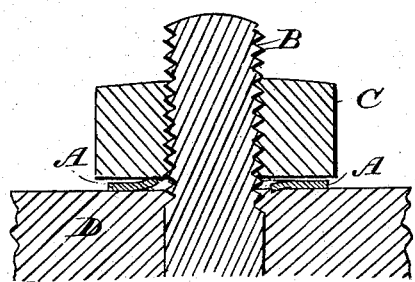

At Fig. 5, A represents the washer or nut-lock, B the bolt, C the nut, and D a fish-plate; and it will be observed that the knife edges or corners *a* of the wings of the washer are slightly embedded in the adjacent faces of the nut and fish-plate. The spring force of the washer induces it to take up any slack which might occur from vibrations, and as an auxiliary means for preventing the turning of the nut I provide the washer, when made of the form shown at Fig. 1, on its edges with slight projections $b\ b$, which serve as stops for the nut when the latter is screwed home. I also form at the four outside corners of the washer shown at Fig. 1 downwardly-projecting spurs $c\ c$. These spurs, as well as the projections $b\ b$, are not cut in the ordinary manner, but are formed between dies while the metal is hot. The spurs $c\ c$ sink into the face of the fish-plate and hold the washer against rotation without the aid of the flange on the rail while the nut is compressing the spring in the washer.

What I claim as new, and desire to secure by Letters Patent, is—

1. A nut-lock formed from plate metal, slightly elliptical, and provided with torsional spring wings or leaves B, twisted, as described, to present knife edges or corners on opposite sides of the plate adapted to grasp or become embedded in the adjacent faces of a nut and fish-plate, substantially as described.

2. In a nut-lock provided with wings B B, as described, the combination therewith of projections $b\ b$, to hold the nut, as hereinbefore set forth.

3. The plate A, formed with the wings B and projection $b$, and also provided with corner spurs, $c$, substantially as and for the purpose set forth.

4. The plate or washer A, formed with a central passage or opening for the bolt, and provided with twisted and expanded wings or leaves B, substantially as shown and described.

In testimony whereof I have hereunto set my hand and seal in the presence of two subscribing witnesses.

FRANCIS MURPHY. [L. S.]

Witnesses:
T. J. KINSELLA,
JOHN McDONNELL.